Patented Feb. 3, 1948

2,435,267

UNITED STATES PATENT OFFICE 2,435,267

METHOD OF AFFIXING LABELS, WRAPS, ETC.

Leo Cahn, Forest Hills, N. Y., assignor to Consolidated Lithographing Corporation, Brooklyn, N. Y., a corporation of New York No Drawing. Application May 15, 1946,
Serial No. 670,044

6 Claims. (Cl. 216—62)

The present invention relates to the art of affixing devices such as labels, wrappers, etc., and more particularly to a heat-sealing method of affixing such devices.

For convenience in reference such devices will be hereinafter referred to as "labels," it being understood, however, that the term "labels" as used in the following description and in the claims is not limited to labels proper but includes also other printed and/or decorative or ornamental or covering sheet material.

Labels of the type which are affixed by heat-sealing are coated on the back surfaces thereof, and sometimes also on their front surfaces, with a thermo-plastic substance which constitutes the bonding medium for affixing the labels, heat and pressure being applied, usually by an electrically heated plate or roller, to the front surfaces of the labels when the latter are in the desired positions on the object to which they are to be affixed. This customary heat-sealing method of affixing labels is objectionable or defective in certain cases and is totally or partially ineffective in others. For example, heat-sealing of labels on metal, especially those of high heat-conductivity, or on glass, especially on glass bottles or other glass containers having liquids therein, or on certain molded plastics, by the customary method has been either impossible or the results have been defective or imperfect. One reason for the difficulty or impossibility of using said customary method is that the high thermal conductivity of metals or the cooling effect of the liquids in glass containers inhibits the proper degree of softening of the coating of thermo-plastic or heat softenable substance on the labels necessary to effectuate the bonding action of said substance, with use of heat at the permissible maximum temperature of the heated plate, roller or other heat-sealing equipment utilized in accordance with said method. In this connection, it will be understood that the temperature of the heat-sealing equipment must be kept sufficiently low to prevent scorching or other impairment of the front surfaces of the labels and hence cannot be raised to the point necessary to properly soften the heat softenable substance especially in an environment in which the above mentioned heat-dissipating action of metals and of liquids takes place.

Other shortcomings of the above mentioned customary method of heat-sealing labels are the difficulty or, in some cases, the impossibility of the use of said method for affixing labels to surfaces which are smooth or non-porous, especially glass and molded-plastic surfaces, and the difficulty or impossibility of using said method for affixing labels to irregularly shaped surfaces or to a surface which has more than one curvature.

The above mentioned objections, difficulties and limitations of affixing labels by heat-sealing them in position are obviated in accordance with and pursuant to one of the objects of this invention.

Another object of the present invention is the provision of a heat-sealing method which, while highly useful generally for affixing labels, is especially valuable for affixing labels to bottles or other containers which have liquids therein.

A further object is the provision of a heat-sealing method which is particularly advantageously for affixing labels to irregularly shaped surfaces, and/or to smooth or non-porous surfaces, to metal surfaces, and/or to molded plastic surfaces.

A yet further object is generally to provide an efficient heat-sealing method of affixing labels.

This invention and the above and other objects, features and advantages thereof will be fully understood from the following description.

In accordance with the preferred method of the present invention, the surfaces to which the labels are to be affixed are subjected to intense heat for a short period of time whereby to raise the temperature of said surfaces to at least the softening temperature of the thermo-plastic or heat softenable substance on the labels, and then, i. e. while said surfaces are in said heated condition, the labels are immediately applied to said surfaces with slight pressure on the front surfaces of the labels to hold them against said surfaces so that the heat of said surfaces softens and thereby activates the thermo-plastic coating on the label for bonding the latter to the surface. No substantial pressure need be applied to the front of the label since it is merely necessary to press the label against the heated surface with only such force as is required to hold the label in position on said surface. It will be noted that in performing this method, it is unnecessary to indirectly heat the thermo-plastic on the back of the label by applying heat to the front surface of the label, as in the customary method heretofore employed, since the heat softenable coating on the back of the label is heated directly and activated directly by the hot surface of the object to which the label is affixed. However, as will be readily understood, it is within the scope of this invention to apply heat and pressure to the front of the label at the time it is placed in position against the hot surface of the object.

The preferred means for subjecting the surface of the object to intense heat is one or several gas burners, preferably of the Bunsen burner type, having a sharp air-regulated conical flame which is directed against said surface. However other types of heaters or combinations of heaters of different types may be used. For example, infra-red lamps can be used either alone or concurrently with gas burners, or followed by gas burners. Usually, a blast of heat lasting a few seconds, say 2 to 8 seconds, is sufficient to heat the surface of the object to the temperature for effecting heat-sealing of the labels to said surface. It will be understood that the heat is applied directly and preferably only to those surface portions which are to be contacted by the heat softenable coating on the labels to be applied.

In the use of the method of the present invention, the surface of the object becomes very hot, namely about 100° C. to about 300° C., due to the fact that heat is quickly accumulated locally in the area of the surface against which the heat is directed. Accordingly, in the case of metal surfaces, the loss of the applied heat by conductivity to adjacent parts is low due to the accumulated heat in the localized area and the rapid transfer of heat to the heat softenable medium of the label which, as explained above, is applied to said surface immediately at the end of the operation of heating said surface. Similarly, in the case of glass bottles or other containers which have liquid therein, for example bottles of whiskey or other alcoholic beverages or bottles of soft drinks, the heat dissipation by such liquid which rendered the above mentioned customary heat-sealing method ineffective or inoperative for affixing labels does not occur in the method of the present invention because of the quick or flash application and accumulation of heat and the rapid transfer of said heat directly to the coating of heat softenable substance instead of by the application of heat thereto through the material of the label. Further, it will be understood that the method of the present invention is well adapted for labelling bottles or other containers which have surfaces which are curved, frequently longitudinally as well as circumferentially of the bottle, because it is unnecessary to use a heated plate, roller, or other heat and pressure applying device, it being possible with the present method to utilize labelling devices of the type utilized in affixing labels by wet or moist adhesives. Likewise, other objects having odd-shaped or irregular surfaces can have labels properly and easily heat-sealed thereto by the present invention.

The method of the present invention is also particularly well adapted for heat-sealing labels to smooth or non-porous surfaces, such as, for example, the smooth surfaces of metal, glass, plastics, glazed material, baked lacquer, enamels, ceramic enamels, etc., it being understood that these specific examples are illustrative of the uses of the invention but are not in limitation thereof. It may be stated that in general the method of the present invention is applicable to the heat-sealing of labels to all surfaces which are not impaired by the intense flash heating operation of the present invention and that this method is highly useful for heat-sealing labels to such surfaces which by reason of shape, or chemical or physical properties are not amenable to ordinary heat-sealing methods. Among the latter are those hereinbefore mentioned, including molded plastics which are not impaired by exposure to direct, intense heat, for example, all plastics molded of thermo-setting resins, exemplified by Bakelite, urea-formaldehyde, and melamine resins, and the heat-resisting resins like nylon or silicon. It is also possible to use the method of the present invention, when carefully performed, to heat-seal labels to the more sensitive thermo-plastic moldings, for example, those formed of cellulose acetate, which do not readily ignite.

The heat-sealing labels employable according to the present invention can be of any known type, and the thermo-plastic or heat softenable coating carried thereby can consist of any of the known heat-sealing substances among which are the following, by way of example and without limitation, namely: a mixture of ethyl cellulose and stearic acid; and a vinyl polymer. The label body or carrier for the printed or decorative matter can be formed of any suitable material, for example, paper, fabric, decalcomanias, transparencies, films, etc., which can be adapted for heat-sealing by coating one of their surfaces with a thermo-plastic or heat softenable substance.

It will be understood that various changes may be made in the method of this invention without departing from the underlying idea or principles thereof within the scope of the appended claims.

Having thus described my invention, what I claim and desire to secure by Letters Patent is:

1. The method of heat-sealing a label carrying heat softenable material to the surface of an object, which comprises directing a flame against said surface and thereby heating the same to a temperature at least as high as the softening temperature of the heat softenable material of the label, and then applying said label to said heated surface while it is in said heated condition.

2. The method of affixing a label by means of heat softenable material to a glass container, comprising heating the portion of the outer surface of said container on which the label is to be applied to a temperature at least as high as the softening temperature of the heat softenable material employed for securing the label, and then attaching said label by said heat softenable material to said surface portion of the container while said surface portion is in said heated condition.

3. The method of affixing a label by means of heat softenable material to the surface of an object, comprising subjecting said surface to the action of a heating medium directed locally at the surface portion over which the label is to be applied whereby to raise the temperature of said surface portion to at least the softening temperature of the heat softenable material employed for securing the label, and then attaching said label by said heat softenable material to said surface portion of the object while said surface portion is in said heated condition.

4. The method of securing a label by means of heat softenable material to the surface of an object, comprising subjecting said surface to intense heat for a few seconds whereby to raise the temperature of said surface to at least the softening-temperature of the heat softenable material, and then attaching said label to said surface by said heat softenable material while said surface in is said heated condition.

5. The method of securing a label to the surface of an object, said label having a coating of heat softenable material on the back thereof, comprising subjecting said surface to intense heat for a few seconds whereby to raise the temperature of said surface to at least the softening-temperature of the heat softenable material, and then applying said label in position on said surface while the latter is in said heated condition thereof whereby the heat is transmitted from said surface to said heat softenable coating for effectuating the sealing of said label to said surface.

6. The method of affixing a label coated on its back with a heat softening material, comprising flash-heating the surface to which the label is to be affixed to a temperature sufficiently high to soften the heat softening coating of the label when the latter is applied in position on said hot surface, and then placing said label in position on said surface while the latter is in said heated condition thereof whereby the heat is transmitted from said surface to said heat softening coating for effectuating the sealing of said label to said surface.

LEO CAHN.

REFERENCES CITED

The following references are of record in the file of this patent:

UNITED STATES PATENTS

| Number | Name | Date |
| --- | --- | --- |
| 2,159,993 | Krueger | May 30, 1939 |